(12) United States Patent
Chen

(10) Patent No.: US 6,220,679 B1
(45) Date of Patent: Apr. 24, 2001

(54) COMPUTER CASING PROVIDED WITH AN ELONGATED RESILIENT SPRING PLATE FOR RESILIENTLY RETAINING A CASING COVER THEREON

(75) Inventor: Tzu-Hsiang Chen, Tainan (TW)

(73) Assignee: Compucase Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/507,211

(22) Filed: Feb. 18, 2000

(51) Int. Cl.[7] ....................................................... H05K 7/18
(52) U.S. Cl. ...................................... 312/223.2; 312/265.5
(58) Field of Search .............................. 312/223.1, 223.2, 312/265.5, 263, 257.1; 361/724, 683; 220/4.02, 4.28

(56) References Cited

U.S. PATENT DOCUMENTS

| | | |
|---|---|---|
| 1,735,375 | 11/1929 | Card et al. . |
| 3,360,321 | 12/1967 | Novales . |
| 5,031,070 | 7/1991 | Hsu . |
| 5,164,886 | 11/1992 | Chang . |
| 5,397,176 | 3/1995 | Allen et al. . |
| 5,584,549 * | 12/1996 | Lybarger et al. ............. 312/257.1 X |
| 5,590,938 | 1/1997 | De Andrea . |
| 5,593,219 | 1/1997 | Ho . |
| 5,944,398 | 8/1999 | Wu . |
| 6,141,209 * | 10/2000 | Kerrigan et al. .............. 312/223.2 X |

\* cited by examiner

Primary Examiner—Janet M. Wilkens
(74) Attorney, Agent, or Firm—Christie, Parker & Hale, LLP

(57) ABSTRACT

A casing includes a main body having a rear end, and a side wall formed with a fixed frame plate that is parallel to and spaced from the side wall and that is proximate to the rear end. A casing cover is disposed slidably on the main body and covering the frame plate. The frame plate has a stop member formed on an upper surface, and front and rear spring-retaining holes formed therethrough. The casing cover has a cover plate abutting against the stop member so as to be prevented from sliding in a rearward direction. An elongated spring plate is disposed on the frame plate, and includes front and rear inclined plate sections extending through the front and rear spring-retaining holes and an abutment plate section abutting against a lower surface of the frame plate in such a manner that intersection of the front and rear inclined plate sections press the cover plate away from the frame plate in a direction perpendicular to the latter, thereby fixing the cover plate with respect to the frame plate. The spring plate can be removed with ease after removal of the cover casing in the forward direction and away from the frame plate.

4 Claims, 6 Drawing Sheets

COMPUTER CASING PROVIDED WITH AN ELONGATED RESILIENT SPRING PLATE FOR RESILIENTLY RETAINING A CASING COVER THEREON

BACKGROUND OF THE INVENTION

1. Field of the Invention

The invention relates to a casing, more particularly to a computer casing provided with an elongated spring plate for resiliently retaining a casing cover thereon.

2. Description of the Related Art

Referring to FIGS. 1 and 2, a conventional computer casing 2 is shown to include a rectangular hollow main body 23 and a casing cover 22 disposed on the main body 23. The main body 23 has a side wall 230 formed with a fixed frame plate 21 that is parallel to and spaced apart from the side wall 230 and that is proximate to a rear end of the main body 23. The frame plate 21 has an inner surface 215, an outer surface 216, a plurality of tongue-retaining holes 212 formed through the frame plate 21, and a stop member 25 that is fixed on the outer surface 216 of the frame plate 21 near the tongue-retaining holes 212 and that is shaped as a shoulder. The casing cover 22 is sleeved slidably on the main body 23, and has an integral cover plate 220 disposed slidably on the frame plate 21 in such a manner that the cover plate 220 abuts against the stop member 25 so as to prevent the same from further sliding forward, thereby permitting rearward sliding movement of the cover plate 220 on the frame plate 21 for removal of the casing cover 22 from the main body 23. A spring unit 3 is disposed on the frame plate 21, and includes an elongated coupling section 33 sleeved on a peripheral edge of the frame plate 21, and a plurality of curved upper biasing sections 311 (only one is visible in FIG. 2) disposed above the upper surface of the frame plate 21 and extending forwardly from the coupling section 33 to bias the cover plate 220 away from the frame plate 21 in a direction that is perpendicular to the frame plate 21, thereby fixing the cover plate 220 relative to the frame plate 21. The spring unit 3 further includes a plurality of pressed lower engaging tongues 321 (only one is visible in FIG. 2) connected integrally to the coupling section 33 and projecting respectively into the tongue-retaining holes 212 in the frame plate 21, thereby preventing untimely disengagement of the spring unit 3 from the frame plate 21.

A drawback of the aforesaid conventional computer casing is that it is inconvenient to mount the spring unit 3 on the frame plate 21 in view of the fact that inner ends 322 (see FIG. 2) of the lower engaging tongues 321 have to be manually operated so as to be retained in the tongue-retaining holes 212 in the frame plate 21. Removal of the spring unit 3 from the frame plate 21 is consequently difficult.

Furthermore, the spring unit 3 easily breaks at positions 323 (see FIG. 2), thereby resulting in separation of the lower engaging tongues 321 from the remaining portion of the spring unit 3.

SUMMARY OF THE INVENTION

Therefore, the object of this invention is to provide a computer casing which includes a main body having a rear end, a side wall formed with a fixed frame plate proximate to the rear end, and a casing cover fixed on the frame plate by the use of an elongated spring plate. The spring plate can be mounted and removed with ease from the frame plate when desired.

Accordingly, the computer casing of this invention includes a rectangular hollow main body, a casing cover and an elongated spring plate. The main body has a rear end, and a side wall which is formed with a fixed frame plate that is parallel to and spaced apart from the side wall and that is proximate to the rear end of the main body. The frame plate has an inner surface, an outer surface, a front spring-retaining hole that is formed therethrough, a rear spring-retaining hole that is formed through the frame plate and that is spaced apart from the front spring-retaining hole, and a stop member that is fixed on the outer surface of the frame plate. The casing cover is sleeved slidably on the main body, and has an integral cover plate, which is disposed slidably on the frame plate and which is parallel to the frame plate. The cover plate is prevented by the stop member of the frame plate from sliding on the frame plate in a direction when the cover slides to contact the stop member. The spring plate is disposed on the frame plate, and has a front inclined plate section, a rear inclined plate section, and an abutment plate portion. The front inclined plate section extends through the front spring-retaining hole in the frame plate and is inclined with respect to the frame plate. The front inclined plate section has a front end that is exposed to the inner surface of the frame plate, and a rear end that is exposed to the outer surface of the frame plate. The rear inclined plate section extends through the rear spring-retaining hole in the frame plate and is inclined with respect to the frame plate. The rear inclined plate section has a front end that is exposed to the outer surface of the frame plate and that is formed integrally with the rear end of the front inclined plate section, and a rear end that is exposed to the inner surface of the frame plate. The abutment plate section abuts against the inner surface of the frame plate, and has an inner end that that is formed integrally with the front end of the front inclined plate section. The front inclined plate section has a narrow inner portion that extends through the front spring-retaining holes in the frame plate, and a wide outer portion that is exposed to the outer surface of the frame plate and that is wider than the narrow inner portion. The wide outer portion is sufficiently wide to prevent extension thereof into the front and rear spring-retaining holes in the frame plate. The cover plate presses intersection of the front and rear inclined plate sections against the frame plate when the cover plate rests on the frame plate, so as to bend the wide outer portion with respect to the narrow inner portion, thereby bringing the wide outer portion into contact and to be parallel with the cover plate and pressing the wide outer portion against the cover plate for fixing the cover plate relative to the frame plate.

When desired, the spring plate can be removed from the frame plate with ease after removal of the casing cover from the frame plate.

BRIEF DESCRIPTION OF THE DRAWINGS

Other features and advantages of this invention will become more apparent in the following detailed description of a preferred embodiment of this invention, with reference to the accompanying drawings, in which.

DETAILED DESCRIPTION OF THE PREFERRED EMBODIMENT

Figure 1:
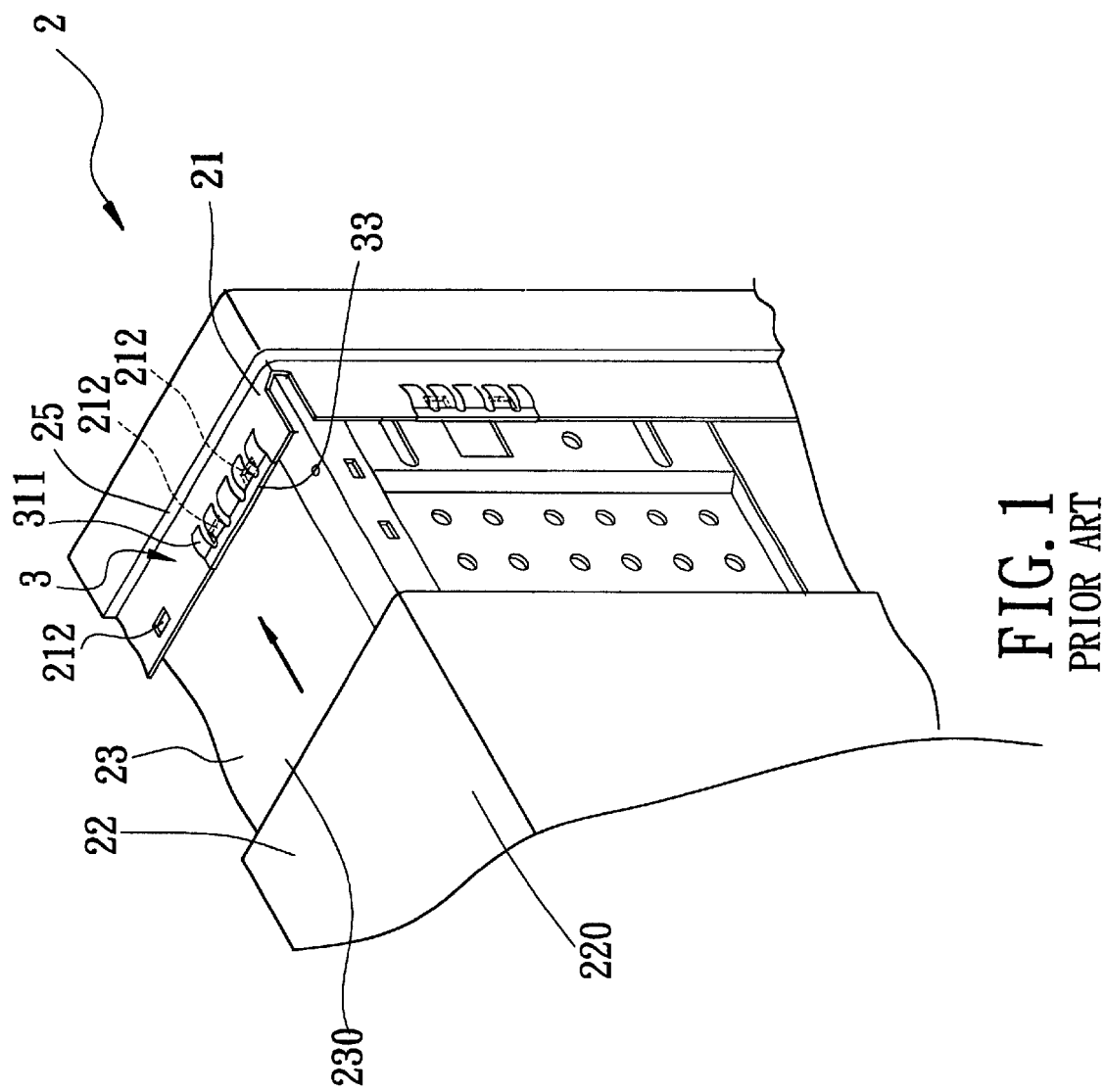
FIG. 1 illustrates how a casing cover is sleeved slidably on a main body of a conventional computer casing.
Figure 2:
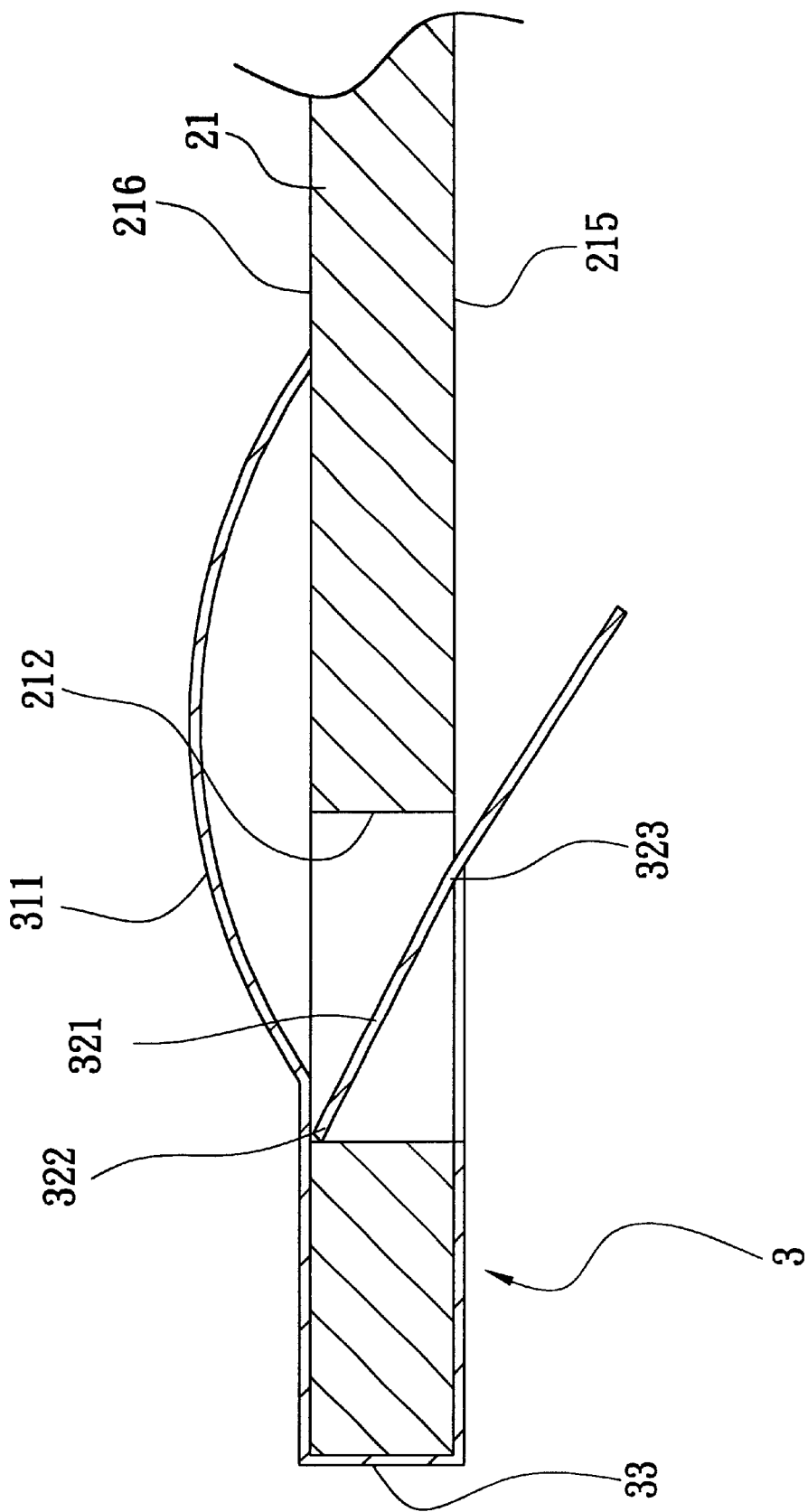
FIG. 2 is a fragmentary sectional view of the conventional computer casing, illustrating how an elongated spring unit is mounted for resiliently retaining the casing cover thereon.
Figure 3:
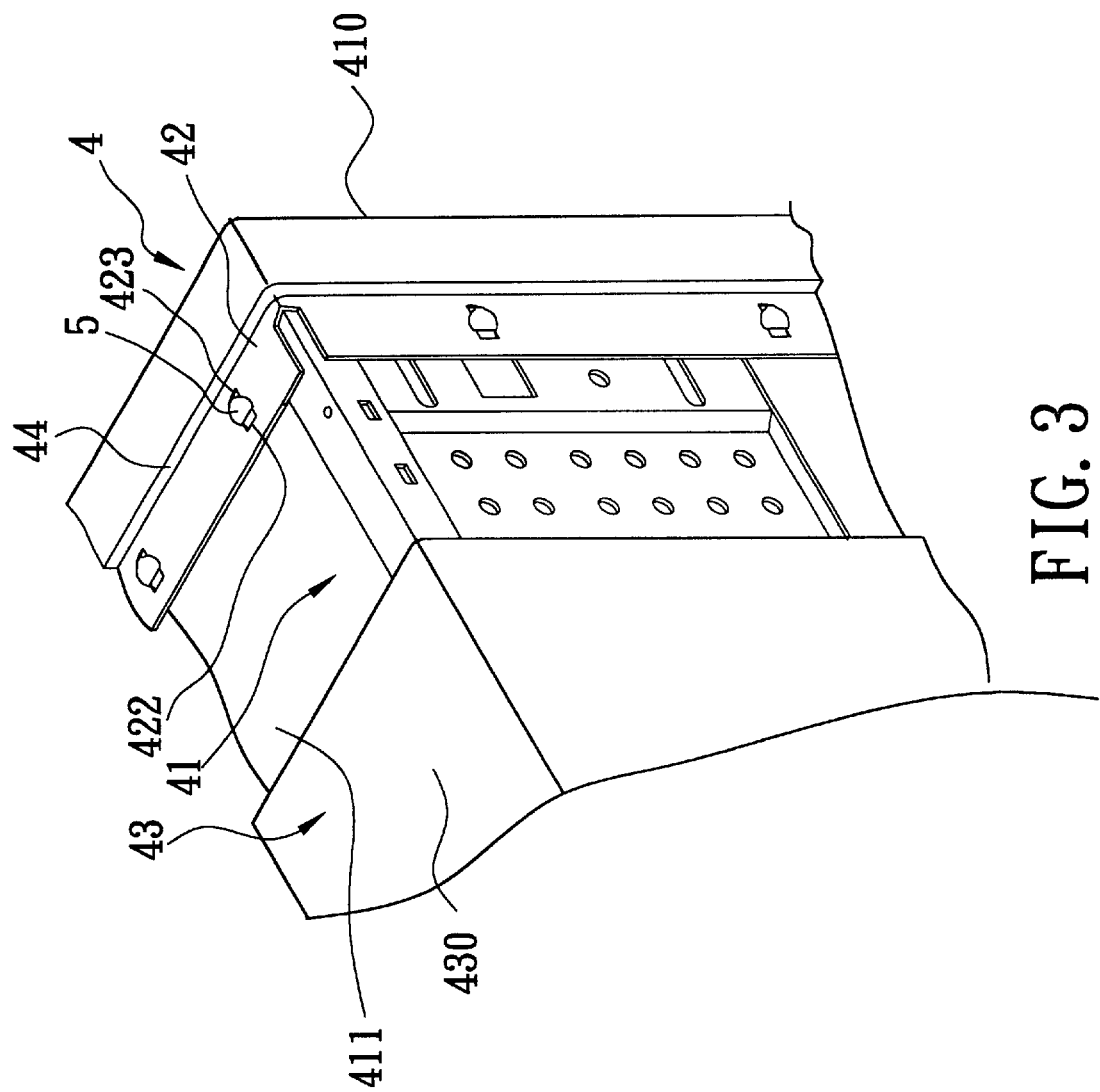
FIG. 3 is a fragmentary perspective view of a preferred embodiment of a computer casing of the present invention, in which the casing cover is removed from a frame plate for the sake of clarity.
Figure 4:
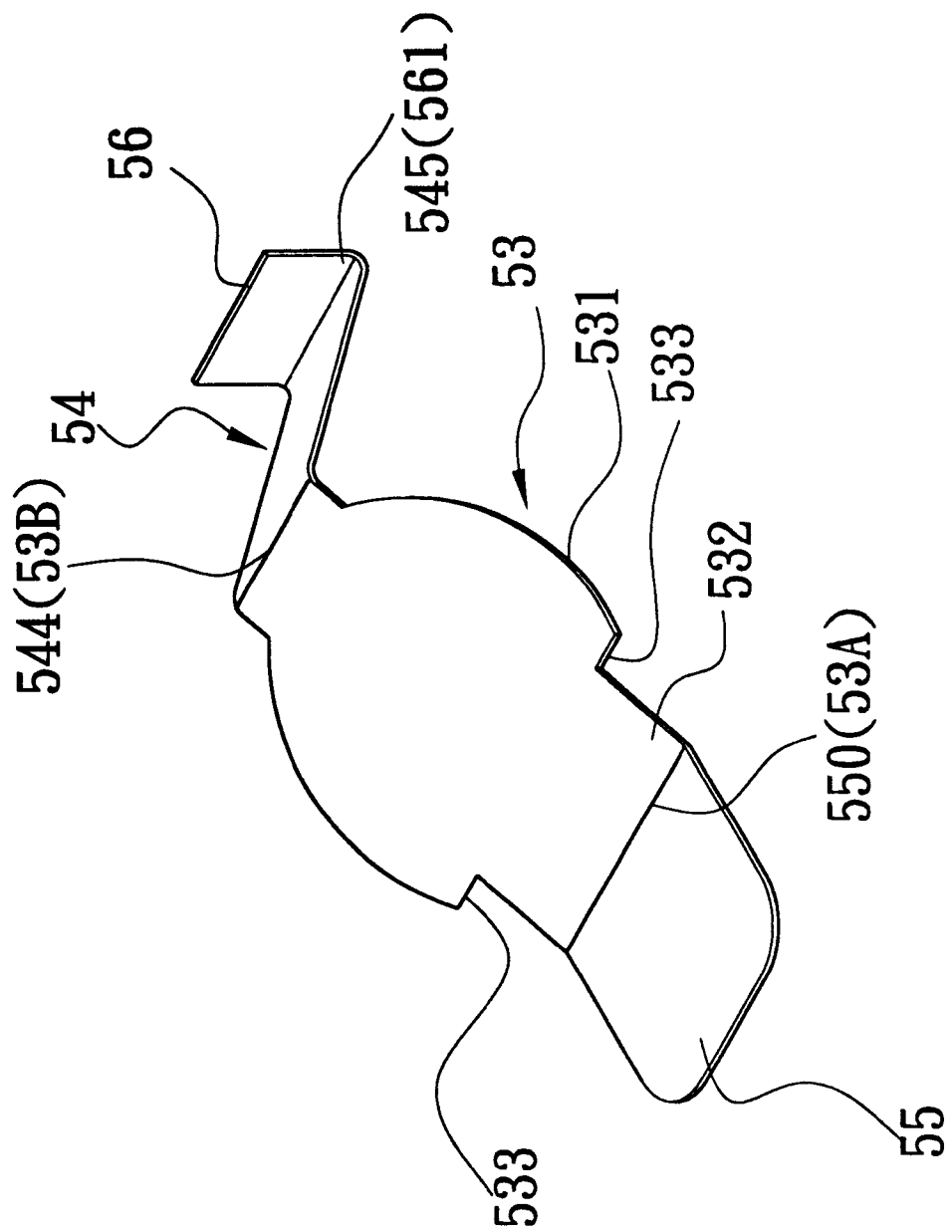
FIG. 4 is a perspective view of an elongated spring plate employed in the preferred embodiment.
Figure 5:
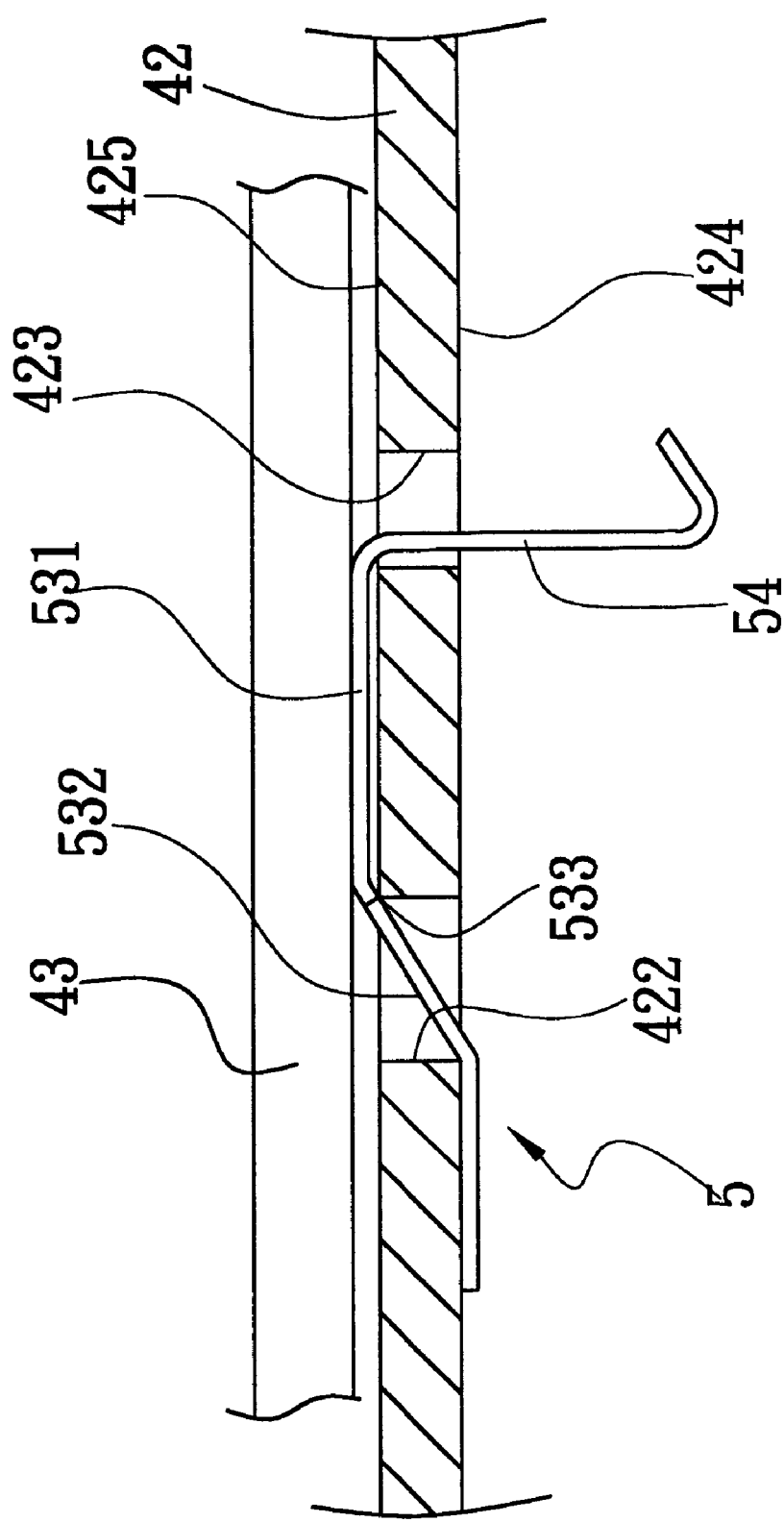
FIG. 5 is a fragmentary sectional view of the preferred embodiment, illustrating how the shape of the spring plate is changed during sliding movement of the casing cover on the frame plate.
Figure 6:
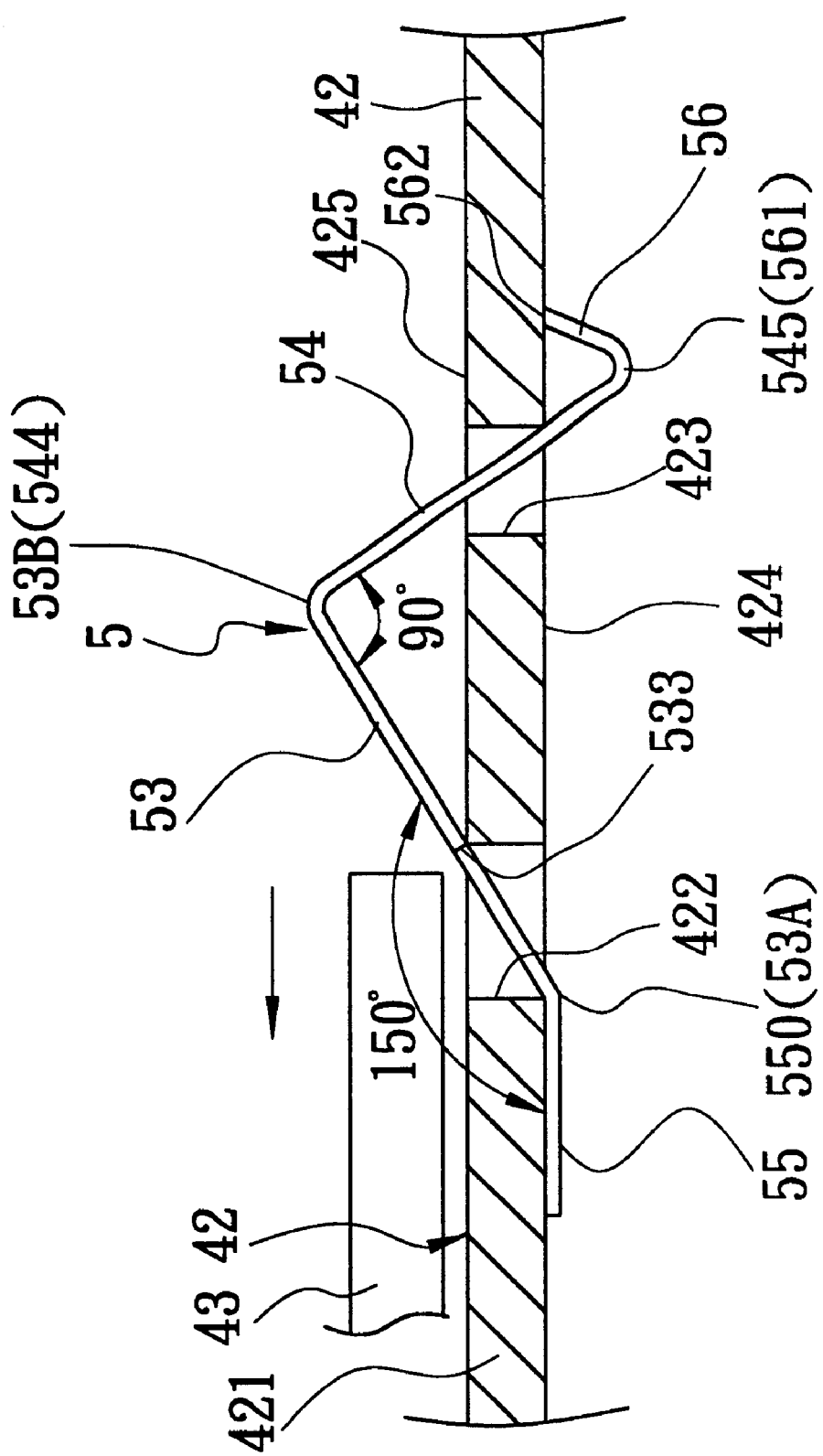
FIG. 6 is a fragmentary sectional view of the preferred embodiment, illustrating how the spring plate reacts when the cover casing is removed therefrom.

Referring to FIGS. 3, 4 and 5, the preferred embodiment of a computer casing 4 of this invention is shown to include a rectangular hollow main body 41, a metal casing cover 43 for preventing electromagnetic interference, and a plurality of elongated spring plates 5.

As illustrated, the rectangular hollow main body 41 has a rear end 410, a top side wall 411 which is formed with a fixed frame plate 42 that is parallel to and spaced apart from the side wall 411 and that is proximate to the rear end 410 of the main body 41. The frame plate 42 has an inner surface 424, an outer surface 425, a front spring-retaining hole 422 that is formed therethrough, a rear spring-retaining hole 423 that is formed through the frame plate 42 behind the front spring-retaining hole 422 and that is spaced apart from the front spring-retaining hole 422, and a stop member 44 that is fixed on the outer surface 425 of the frame plate 42.

The casing cover 43 is sleeved slidably on the main body 41, and has an integral cover.plate 430, which is disposed slidably on the frame plate 42 and which is parallel to the frame plate 42. The cover plate 430 can slide rearward on the frame plate 42 to contact the stop member 44 so as to prevent further rearward sliding of the cover plate 430 on the frame plate 42, thereby permitting forward sliding movement of the cover plate 430 on the frame plate 42.

The elongated spring plate 5 is disposed on the frame plate 42, and has a front inclined plate section 53, a rear inclined plate section 54, and an abutment plate portion 55. The front inclined plate section 53 extends through the front spring-retaining hole 422 in the frame plate 42, and is inclined with respect to the frame plate 42. The front inclined plate section 53 has a front end (53A) that is exposed to the inner surface 424 of the frame plate 42, and a rear end (53B) that is exposed to the outer surface 425 of the frame plate 42. The rear inclined plate section 54 extends through the rear spring-retaining hole 423 in the frame plate 42, and is inclined with respect to the frame plate 42. The rear inclined plate section 54 has a front end 544 that is exposed to the outer surface 425 of the frame plate 42 and that is formed integrally with the rear end (53B) of the front inclined plate section 53, and a rear end 545 that is exposed to the inner surface 424 of the frame plate 42. The abutment plate section 55 abuts against the inner surface 424 of the frame plate 42, and has an inner end 550 that is formed integrally with the front end 53A of the front inclined plate section 53. The front inclined plate section 53 has a narrow inner portion 532 that extends through the front spring-retaining hole 422 in the frame plate 42, and a wide outer portion 531 that is exposed to the outer surface 425 of the frame plate 42 and that is wider than the narrow inner portion 532. The wide outer portion 531 is sufficiently wide to prevent extension thereof into the front spring-retaining hole 422 in the frame plate 42. The cover plate 430 presses, by virtue of gravity, the intersection of the front and rear inclined plate sections 53,54 presses against the cover plate 430 when the cover plate 430 rests on the frame plate 42, so as to bend the wide outer portion 531 with respect to the narrow inner portion 532, thereby bringing the wide outer portion 531 into contact and to be parallel with the cover plate 4301 and consequently pressing the wide outer portion 531 against the cover plate 430 for fixing the cover plate 430 relative to the frame plate 42.

In the preferred embodiment, the front and rear inclined plate sections 53, 54 of the spring plate 5 are perpendicular to each other. Preferably, the abutment plate section 55 forms an obtuse angle with the front inclined plate section 53. The spring plate 5 further includes a positioning plate section 56, which has a front end 561 that is formed integrally with the rear end 545 of the rear inclined plate section 54, and a rear end 562 that abuts against the inner surface 424 of the frame plate 42.

Preferably, the stop member 44 is a shoulder that is formed on the outer surface 425 of the frame plate 42 and that is located behind the rear spring-retaining hole 423.

Note that the frame plate 42 includes three integrally formed straight sections respectively disposed on and spaced apart from three side walls of the main body 41. Each of the straight sections is formed with two units of spring-retaining holes 422,423 within which two of the spring plates 5 are mounted as explained above. When the spring plate 5 is mounted on the frame plate 42, the abutment plate section 55 is firstly inserted through the front spring-retaining hole 422 so as to be anchored on the inner surface of the frame plate 42, and the rear inclined plate section 54 is slightly bent with respect to the front inclined plate section 53 in order to be inserted and anchored in the rear spring-retaining hole 423 of the frame plate 42. Under such a condition, the abutment plate section 55 and the narrow inner portion 532 are retained securely in the front spring-retaining holes 422, because the abutment plate section 55 and the narrow inner portion 532 of the front inclined plate section 53 have a width corresponding to the width of the front spring-retaining hole 423 and due to engagement between the positioning plate section 56 and the inner surface of the frame plate 42.

When desired, all of the spring plates 5 can be removed from the frame plate 42 with ease, after forward removal of the casing cover 43 from the frame plate 42.

With this invention thus explained, it is apparent that numerous modifications and variations can be made without departing from the scope and spirit of this invention. It is therefore intended that this invention be limited only as indicated in the appended claims.

I claim:

1. A computer casing comprising:

a rectangular hollow main body having a rear end, and a side wall which is formed with a fixed frame plate that is parallel to and spaced apart from said side wall and that is proximate to said rear end of said main body, said frame plate having an inner surface, an outer surface, a front spring-retaining hole that is formed therethrough, a rear spring-retaining hole that is formed through said frame plate behind said front spring-retaining hole and that is spaced apart from said front spring-retaining hole, and a stop member fixed on said outer surface of said frame plate;

a casing cover sleeved slidably on said main body, and having an integral cover plate, which is disposed slidably on said frame plate and which is parallel to said frame plate, said cover plate being prevented by said stop member of said frame plate from sliding on said frame plate in a direction when said cover plate slides to contact said stop member; and an elongated spring plate disposed on said frame plate and having
- a front inclined plate section extending through said front spring-retaining hole in said frame plate and being inclined with respect to said frame plate, said front inclined plate section having a front end that is exposed to said inner surface of said frame plate, and a rear end that is exposed to said outer surface of said frame plate,
- a rear inclined plate section extending through said rear spring-retaining hole in said frame plate and being inclined with respect to said frame plate, said rear inclined plate section having a front end that is exposed to said outer surface of said frame plate and that is formed integrally with said rear end of said front inclined plate section, and a rear end that is exposed to said inner surface of said frame plate, and
- an abutment plate section abutting against said inner surface of said frame plate, and having a rear end that is formed integrally with said front end of said front inclined plate section, said front inclined plate section having a narrow inner portion that extends through said front spring-retaining hole in said frame plate, and a wide outer portion that is exposed to said outer surface of said frame plate and that is wider than said narrow inner portion, said wide outer portion being sufficiently wide to prevent extension thereof into said front spring-retaining hole in said frame plate, said cover plate pressing intersection of said front and rear inclined plate sections of said spring plate against said frame plate when said cover plate rests on said spring plate, so as to bend said wide outer portion with respect to said narrow inner portion, thereby bringing said wide outer portion into contact and to be parallel with said cover plate and pressing said wide outer portion against said cover plate for fixing said cover plate relative to said frame plate.

2. The computer casing as defined in claim 1, wherein said front and rear inclined plate sections of said spring plate are perpendicular to each other.

3. The computer casing as defined in claim 1, wherein said abutment plate section is connected to said front end of said front inclined plate section, said spring plate further including a positioning plate section, which has a front end that is formed integrally with said rear end of said rear inclined plate section, and a rear end that abuts against said inner surface of said frame plate.

4. The computer casing as defined in claim 1, wherein said stop member is a shoulder that is formed on said outer surface of said frame plate and that is located behind said rear spring-retaining hole in said frame plate.

\* \* \* \* \*